United States Patent
Hayashi et al.

(10) Patent No.: US 11,542,167 B2
(45) Date of Patent: Jan. 3, 2023

(54) SILICA PARTICLE DISPERSION LIQUID AND PRODUCTION METHOD THEREOF

(71) Applicant: JGC CATALYSTS AND CHEMICALS LTD., Kanagawa (JP)

(72) Inventors: Shogo Hayashi, Kitakyushu (JP); Miki Egami, Kitakyushu (JP); Mitsuaki Kumazawa, Kitakyushu (JP); Ryo Muraguchi, Kitakyushu (JP); Michio Komatsu, Kitakyushu (JP)

(73) Assignee: JGC CATALYSTS AND CHEMICALS LTD., Kanagawa (JP)

( * ) Notice: Subject to any disclaimer, the term of this patent is extended or adjusted under 35 U.S.C. 154(b) by 294 days.

(21) Appl. No.: 17/029,954

(22) Filed: Sep. 23, 2020

(65) Prior Publication Data
US 2021/0094833 A1  Apr. 1, 2021

(30) Foreign Application Priority Data
Sep. 30, 2019  (JP) .............................. JP2019-180703

(51) Int. Cl.
*C01B 33/141* (2006.01)
(52) U.S. Cl.
CPC ........ *C01B 33/141* (2013.01); *C01P 2004/62* (2013.01); *C01P 2004/64* (2013.01)

(58) Field of Classification Search
None
See application file for complete search history.

(56) References Cited

U.S. PATENT DOCUMENTS

| 6,083,314 A | 7/2000 | Nakashima et al. |
| 2010/0146864 A1 | 6/2010 | Nakayama et al. |

FOREIGN PATENT DOCUMENTS

| JP | H11-61043 A | 3/1999 |
| JP | 2003-133267 A | 5/2003 |
| JP | 2013-032276 A | 2/2013 |

*Primary Examiner* — Coris Fung
*Assistant Examiner* — Keling Zhang
(74) *Attorney, Agent, or Firm* — Pearne & Gordon LLP (57) ABSTRACT

Provided is a production method of a silica particle dispersion liquid which includes, preparing a linked silica particle by adding a liquid A containing alkoxysilane and a liquid B containing an alkali catalyst to a liquid containing water, an organic solvent, and an alkali catalyst in a container. The preparing a linked silica particle includes initially adding an alkali catalyst, the initially adding an alkali catalyst includes decreasing a molar ratio of an alkali catalyst to silica in the liquid in the container to 0.15 to 0.60 by adding the liquid A containing alkoxysilane to the liquid in the container, and increasing the molar ratio by 0.2 or more by adding the liquid B to the liquid having the decreased molar ratio in the container.

5 Claims, 1 Drawing Sheet

SILICA PARTICLE DISPERSION LIQUID AND PRODUCTION METHOD THEREOF

CROSS-REFERENCE TO RELATED APPLICATION

This application claims priority from Japanese Patent Application No. 2019-180703 filed with the Japan Patent Office on Sep. 30, 2019, the entire content of which is hereby incorporated by reference.

BACKGROUND

1. Technical Field

An embodiment of the present disclosure relates to a silica particle dispersion liquid and a production method thereof.

2. Related Art

Various integrated circuits are used in computers and various electronic devices. As these integrated circuits decrease in size and increase in performance, the circuits are desired to increase in density and performance.

For example, in the production of a semiconductor integrated circuit, an inter-wiring-layer film (insulating film) is formed on a substrate such as a silicon wafer. On the inter-wiring-layer film (insulating film), a groove pattern for metal wiring is formed. As necessary, a barrier metal layer such as tantalum nitride (TaN) is formed by a sputtering method or the like. Subsequently, a copper film for metal wiring is formed by a chemical vapor deposition (CVD) method or the like. Here, the disposed barrier metal layer such as TaN can suppress a decrease in insulation properties of the interlayer insulating film associated with the diffusion and erosion of copper, impurities, or the like into the interlayer insulating film and also enhance adhesiveness between the interlayer insulating film and copper.

Next, unnecessary copper and barrier metal (sometimes referred to as a sacrifice layer) formed outside the groove are removed by polishing through a chemical mechanical polishing (CMP) method, and at the same time, the upper surface is planarized as much as possible. In this manner, a metal film remains only in the groove to form a copper wiring and circuit pattern.

A silica particle having a spherical or irregular shape has been produced as a silica particle used as a polishing material utilized in this CMP method. A silica particle having an irregular shape is suitably used as a polishing material that achieves a certain polishing rate.

As a production method of such a silica particle having an irregular shape, a production method of a short fibrous silica including (i) to (iii) below is proposed (see JP-A-11-061043 and JP-A-2003-133267). This short fibrous silica has an average diameter (D) of 10 to 30 nm, a length (L) of 30 to 100 nm, and an aspect ratio (L/D) of 3 to 10. (i) A hydrolysis reaction of alkoxysilane is performed by adding a catalyst to a mixed solution containing water, an organic solvent, and alkoxysilane. Accordingly, a silica fine particle having a particle diameter of 10 to 30 nm is generated. Thereafter, (ii) an aqueous dispersion of the silica fine particle is prepared by removing an unreacted alkoxysilane, organic solvent, and catalyst from the mixed solution after the reaction. Adjustment is performed such that the solid content concentration of the silica fine particle in the aqueous dispersion liquid becomes 0.1 to 5% by mass, and the ammonia concentration becomes 50 to 400 ppm. (iii) The aqueous dispersion liquid is hydrothermally treated at a temperature of 250° C. or higher.

Also, as a production method of a silica particle having an irregular shape with a silicic acid liquid as a raw material, the following method is proposed (see JP-A-2013-032276). A polymerized silicic acid liquid having a silicic acid viscosity ranging from 0.9 to 100 mPa·s is prepared by aging a silicic acid liquid having a pH ranging from 1.0 to 7.0 and a silica concentration of 0.05 to 3.0% by mass at 1 to 98° C. A seed liquid is prepared by adding alkali to the polymerized silicic acid liquid and heating the mixture. The obtained seed liquid is built up.

SUMMARY

A production method of a silica particle dispersion liquid includes, preparing a linked silica particle by adding a liquid A containing alkoxysilane and a liquid B containing an alkali catalyst to a liquid containing water, an organic solvent, and an alkali catalyst in a container. The preparing a linked silica particle includes initially adding an alkali catalyst, the initially adding an alkali catalyst includes decreasing a molar ratio of an alkali catalyst to silica in the liquid in the container to 0.15 to 0.60 by adding the liquid A containing alkoxysilane to the liquid in the container, and increasing the molar ratio by 0.2 or more by adding the liquid B to the liquid having the decreased molar ratio in the container.

BRIEF DESCRIPTION OF DRAWINGS

In FIG. 1, a portion painted in black is an image of a connection portion between particles, and the connection portion may contain a space.

DETAILED DESCRIPTION

In the following detailed description, for purpose of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

However, in the production methods of JP-A-11-061043 and JP-A-2003-133267, it is necessary to hydrothermally treat, at a temperature as high as 250° C. or higher, a low-concentration dispersion liquid having a solid content concentration of as low as 0.1 to 5% by mass. Therefore, the production efficiency is poor, and the production cost is high.

The present inventors attempted to hydrothermally treat a dispersion liquid having a high silica concentration in the methods of these patent literatures. However, the silica particle was gelled, and an intended linked particle was not obtained.

Also, in the production method of JP-A-2013-032276, a silicic acid liquid is used as a raw material. Therefore, a high purity silica particle is unlikely to be obtained.

An object of the present disclosure is to provide an efficient production method of a linked silica particle-containing dispersion liquid as a silica particle dispersion liquid. With this linked silica particle-containing dispersion liquid, a substrate surface can be polished at a high rate while suppressing the remainder of particles on the substrate after polishing. A silica particle dispersion liquid is useful for polishing, for example, a substrate of a metal wiring layer in a semiconductor integrated circuit.

The present inventors found that a linked silica particle can be efficiently produced by adding an alkali catalyst under specific conditions in the preparation of a silica particle with alkoxysilane. Thus, the technology of the present disclosure has been accomplished. Specifically, the present inventors found the following fact. That is, a primary particle is formed by hydrolyzing and polycondensing alkoxysilane. Thereafter, an alkali catalyst is added at a stretch. This effectively promotes coalescence among particles. Accordingly, generation of an unreacted product decreases, and a silica particle dispersion liquid containing a linked silica particle at a high proportion is obtained.

That is, a production method of a silica particle dispersion liquid according to an embodiment of the present disclosure includes preparing a linked silica particle by adding a liquid A containing alkoxysilane and a liquid B containing an alkali catalyst to a liquid containing water, an organic solvent, and an alkali catalyst in a container. The preparing a linked silica particle includes initially adding an alkali catalyst. The initially adding an alkali catalyst includes decreasing a molar ratio of an alkali catalyst to silica in the liquid in the container to 0.15 to 0.60 by adding the liquid A containing alkoxysilane and increasing the molar ratio by 0.2 or more by adding the liquid B to the liquid having the decreased molar ratio in this container.

According to the production method of an embodiment of the present disclosure, a linked silica particle-containing dispersion liquid can be efficiently produced. With this linked silica particle-containing dispersion liquid, a substrate surface can be polished at a high rate while suppressing the remainder of particles on the substrate after polishing.

[Production Method of Silica Particle Dispersion Liquid]

A production method of a silica particle dispersion liquid according to an embodiment of the present disclosure includes preparing a linked silica particle by adding a liquid A containing alkoxysilane and a liquid B containing an alkali catalyst to a liquid containing water, an organic solvent, and an alkali catalyst in a container, that is, a silica particle preparation process. This silica particle preparation process includes initially adding an alkali catalyst, that is, an initial alkali catalyst adding process. The initial alkali catalyst adding process includes decreasing a molar ratio of an alkali catalyst to silica in the liquid in the container to 0.15 to 0.60 (lower limit range of a molar ratio) by adding a liquid A containing alkoxysilane to the liquid in the container and increasing the molar ratio by 0.2 or more (increase proportion of a molar ratio) by adding the above-described liquid B to the liquid having the decreased molar ratio in the container.

In the past, an alkali catalyst was added concurrently with alkoxysilane when preparing particles. In contrast to this, according to the method of the present embodiment, particles are grown by intermittently (continuously or intermittently) adding alkoxysilane without adding an alkali catalyst until the ratio of an alkali catalyst to silica of the liquid in the container decreases to the lower limit range of a molar ratio. When the ratio of an alkali catalyst reaches the lower limit range of a molar ratio, an alkali catalyst is poured at a stretch. Accordingly, coalescence among particles effectively proceeds. Therefore, a linked silica particle constituted by linked two or more primary particles can be produced at a high ratio without generating an unreacted product. It is noted that an alkali catalyst is preferably not added until the ratio of an alkali catalyst decreases to the lower limit range of a molar ratio. However, an alkali catalyst may be added as necessary.

[Silica Particle Preparation Process]

A silica particle preparation process includes an initial alkali catalyst adding process. In the initial alkali catalyst adding process, the molar ratio of an alkali catalyst to silica in a liquid containing water, an organic solvent, and an alkali catalyst in a container is decreased to 0.15 to 0.60 by adding the liquid A (alkoxysilane) to the liquid. Thereafter, the molar ratio is increased by 0.2 or more by adding a liquid B (alkali catalyst) to the liquid in the container.

Linkage of particles can be effectively promoted by adding an alkali catalyst such that the increase proportion of the molar ratio falling in the above-described lower limit range of a molar ratio becomes the above-described increase proportion of a molar ratio.

The lower limit range of a molar ratio is preferably 0.20 to 0.55, and more preferably 0.20 to 0.50. Also, the increase proportion of a molar ratio is preferably 0.22 or more, and more preferably 0.25 or more. The upper limit of the increase proportion of a molar ratio is not particularly limited, as long as the liquid in the container is not gelled. The upper limit of the increase proportion of a molar ratio is, for example, 0.6, and preferably 0.5.

In the initial alkali catalyst adding process, the average particle diameter of the primary particle of silica in the container immediately before the addition of the liquid B is preferably 5 to 200 nm. When this average particle diameter is less than 5 nm, the specific surface area of the particle is excessively large, which excessively promotes coalescence due to the addition of an alkali catalyst. Therefore, there is a risk that a gelled product of silica may be formed. When this average particle diameter exceeds 200 nm, the specific surface area of the particle is small, which is unlikely to promote coalescence due to the addition of an alkali catalyst. Therefore, there is a risk that a linked particle may not obtained. When an alkali catalyst is added at a stretch to the silica particle having the average particle diameter in the above-described range, a gelled product is rarely produced, and a linked particle is efficiently obtained. The average particle diameter of the primary particle of this silica is more preferably 5 to 150 nm, further preferably 5 to 100 nm, and most preferably 5 to 50 nm.

Figure 1:
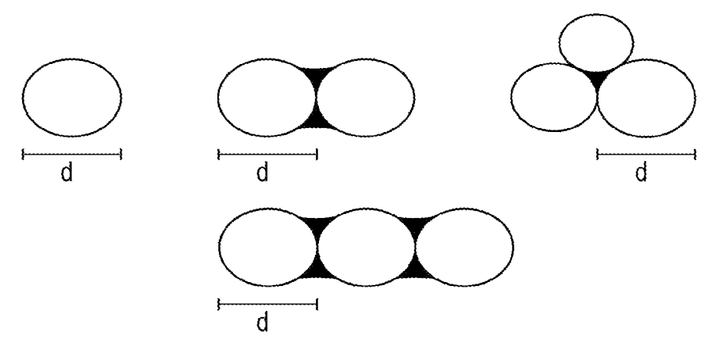
FIG. 1 is a diagram illustrating a calculation method of an average particle diameter in an embodiment of the present disclosure.

Here, the average particle diameter of the primary particle of silica is obtained by taking an electron micrograph of silica particles, measuring the longest primary particle diameter for each of optional 100 particles as exemplified in FIG. 1, and calculating an average of the measured longest diameters.

In the initial alkali catalyst adding process, the silica concentration of the liquid in the container immediately before the addition of the liquid B is preferably 0.5 to 10.0% by mass. When this silica concentration is less than 0.5% by mass, the contact frequency among particles is low. Therefore, coalescence due to the addition of an alkali catalyst is rarely caused, and there is a risk that a linked particle may not be obtained. When this silica concentration exceeds 10.0% by mass, the contact frequency among particles is high depending on the average particle diameter, and coalescence due to the addition of an alkali catalyst is excessively promoted. Therefore, there is a risk that a gelled product may be generated. When an alkali catalyst is added at a stretch to the silica particle dispersion liquid having the concentration in the above-described range, a linked particle can be effectively obtained. The silica concentration of the liquid in the container immediately before the addition of the liquid B is more preferably 1.0 to 8.5% by mass, and further preferably 1.0 to 7.0% by mass.

In the present embodiment, the liquid A containing alkoxysilane is intermittently added after the initial alkali catalyst adding process. At the same time, the liquid B containing an alkali catalyst may be intermittently added. However, it is more preferable, similarly to the initial alkali catalyst adding process, not to add the liquid B (alkali catalyst) until the ratio of an alkali catalyst to silica of the liquid in the container decreases to a prescribed range, and to pour the liquid B at a stretch when the ratio of an alkali catalyst has reached the prescribed range.

That is, the initial alkali catalyst adding process is preferably followed by additionally adding an alkali catalyst, that is, an additional alkali catalyst adding process. The additional alkali catalyst adding process includes decreasing a molar ratio of an alkali catalyst to silica in the liquid in the container to 0.10 to 0.55 (lower limit range of a molar ratio in the second addition and thereafter) by intermittently adding the liquid A containing alkoxysilane and increasing the molar ratio by 0.05 or more (increase proportion of a molar ratio in the second addition or thereafter) by adding the liquid B (alkali catalyst) to the liquid having the decreased molar ratio in the container. Accordingly, generation of an unreacted product can be further suppressed.

In the additional alkali catalyst adding process, the lower limit range of a molar ratio is preferably 0.12 to 0.50. When the lower limit range of a molar ratio is less than this range, there is a risk that a microparticle and/or an unreacted product may be generated, which may cause the reduction in a polishing rate and the occurrence of the remainder of particles on the substrate after polishing. The lower limit range of a molar ratio is more preferably 0.15 to 0.45. Also, the increase proportion of a molar ratio is preferably 0.07 or more, and more preferably 0.10 or more. The upper limit of the increase proportion of a molar ratio is not particularly limited, as long as the liquid in the container is not gelled. The upper limit of the increase proportion of a molar ratio is, for example, 0.4, and preferably 0.3.

A timing for adding the liquid B in the additional alkali catalyst adding process is preferably when the molar ratio, which has increased due to the previous alkali catalyst adding process, has decreased by 0.05 or more, and more preferably when this molar ratio has decreased by 0.1 or more.

This additional alkali catalyst adding process can be performed once or multiple times until a desired silica particle is prepared. The additional alkali catalyst adding process is performed, for example, 1 to 4 times, and preferably 1 to 2 times. That is, when combined with the initial alkali catalyst adding process, the addition of an alkali catalyst is performed preferably 2 to 5 times, and more preferably 2 to 3 times.

Examples of the organic solvent used in the silica particle preparation process include alcohols, ketones, ethers, and esters. More specific examples include alcohols such as methanol, ethanol, propanol, and butanol, ketones such as methyl ethyl ketone and methyl isobutyl ketone, glycol ethers such as methyl Cellosolve, ethyl Cellosolve, and propylene glycol monopropyl ether, glycols such as ethylene glycol, propylene glycol, and hexylene glycol, and esters such as methyl acetate, ethyl acetate, methyl lactate, and ethyl lactate. Among these, methanol or ethanol is more preferable, and methanol is particularly preferable. These organic solvents may be used individually, or a mixture of two or more thereof may be used.

As the alkoxysilane in the liquid A, one or two or more of the alkoxysilanes represented by [Formula 1] below are used. The liquid A may contain the above-described organic solvents.

$$X_n Si(OR)_{4-n}  \quad \text{[Formula 1]}$$

X indicates a hydrogen atom, a fluorine atom, or an alkyl group, an aryl group, or a vinyl group of 1 to 8 carbons. R indicates a hydrogen atom, or an alkyl group, an aryl group, or a vinyl group of 1 to 8 carbons. n is an integer of 0 to 3.

Examples of the alkoxysilanes represented by Formula [1] above include tetramethoxysilane, tetraethoxysilane, tetraisopropoxysilane, tetrabutoxysilane, tetraoctoxysilane, methyltrimethoxysilane, methyltriethoxysilane, methyltriisopropoxysilane, ethyltrimethoxysilane, ethyltriethoxysilane, ethyltriisopropoxysilane, octyltrimethoxysilane, octyltriethoxysilane, vinyltrimethoxysilane, vinyltriethoxysilane, phenyltrimethoxysilane, phenyltriethoxysilane, trimethoxysilane, triethoxysilane, triisopropoxysilane, fluorotrimethoxysilane, fluorotriethoxysilane, dimethyldimethoxysilane, dimethyldiethoxysilane, diethyldimethoxysilane, diethyldiethoxysilane, dimethoxysilane, diethoxysilane, difluorodimethoxysilane, difluorodiethoxysilane, trimethylmethoxysilane, trimethylethoxysilane, trimethylisopropoxysilane, trimethylbutoxysilane, trifluoromethyltrimethoxysilane, and trifluoromethyltriethoxysilane.

Here, preferable alkoxysilanes are those having a short alkyl chain, such as tetramethoxysilane (TMOS) and tetraethoxysilane (TEOS). These are fast in hydrolysis rate and easily densified. Therefore, with the use of these alkoxysilanes, a silica particle having a low carbon content is easily obtained.

The addition rate of alkoxysilane has an influence on the number and the proportion of linked silica particles to be obtained. When the addition rate is fast, the formation of a seed particle due to the hydrolysis reaction of alkoxysilane occurs concurrently with a coalescence reaction among particles. Accordingly, the particle size distribution is likely to be non-uniform, and an unreacted product is likely to be generated. When the addition rate is slow, there is a risk that work efficiency may deteriorate, and the proportion of a linked silica particle may be small.

As the alkali catalyst in the liquid B, a basic substance is used. Examples of the basic substance include ammonia, amine, alkali metal hydrides, alkali earth metal hydrides, alkali metal hydroxides, alkali earth metal hydroxides, quaternary ammonium compounds, and amine-based coupling agents. These catalysts can be used independently or in combinations. Ammonia is preferable depending on the use condition, the use amount, and the like. The liquid B may contain water.

Ammonia does not contain an organic group in its structure. Therefore, an organic group is less likely to coat an OH group on a particle surface while ammonia is processed into a polishing composition. Accordingly, ammonia is less likely to inhibit an interaction between a particle and an additive. Also, handling of ammonia during production is easy, and excess ammonia can be easily discharged outside a system by heating or the like. This also facilitates adjustment of the amount of ammonia remaining in a dispersion liquid. Furthermore, unlike alkali metal hydroxides, alkali earth metal hydroxides, alkali metal hydroxides, and alkali earth metal hydroxides, ammonia does not contain a metal element which can influence insulation properties of a circuit of a polished substrate. Ammonia is also preferable in this regard.

The amount (final amount) of the catalyst used for the hydrolysis of alkoxysilane is preferably 0.005 to 1 mol per 1 mol of alkoxysilane. When the amount of the catalyst is less than 0.005 mol, hydrolysis is rarely caused, and thus there is a risk that the particle size distribution may be widened. Conversely, when the amount of the catalyst exceeds 1 mol, the speed of hydrolysis significantly increases. Accordingly, there is a risk that the particle is unlikely to be obtained, and a gelled product may be formed. The amount of the catalyst to be added is more preferably 0.01 to 0.8 mol per 1 mol of alkoxysilane.

The amount of water used for hydrolysis, per 1 mol of an Si—OR group constituting alkoxysilane, is preferably 0.5 to 10 mol, and more preferably 1 to 5 mol.

The hydrolysis of alkoxysilane is usually performed under normal pressure at a temperature that is not higher than the boiling point of a used solvent. It is noted that as a method of preparing a silica particle dispersion liquid through the hydrolysis of alkoxysilane, a so-called seed method of adding a previously prepared seed particle into a liquid in a container can also be adopted.

When hydrolysis is performed under the above-described conditions, polycondensation of alkoxysilane proceeds in a three-dimensional manner, and a desired particle can be obtained.

A final silica particle dispersion liquid is produced through various processes after the above-described preparation of the silica particle (after the silica particle preparation process). Examples of various processes include a water substitution process of substituting, with water, the organic solvent in the silica particle dispersion liquid, an aging process of adjusting the properties of the surface and inside of the silica particle, and a concentration process of concentrating the silica particle dispersion liquid.

Furthermore, a preliminary aging process for stabilizing the silica particle may be performed during or after the silica particle preparation process. This preliminary aging process promotes the polycondensation reaction of alkoxysilane and also suppresses occurrence of a microparticle. Accordingly, a silica particle dispersion liquid having a uniform particle size distribution can be obtained.

[Water Substitution Process]

In the water substitution process, the organic solvent in the silica particle dispersion liquid is substituted with water (pure water). The present process can be performed at an appropriate stage after the dispersion liquid preparation process. Especially, the present process is preferably performed before the aging process.

The method of water substitution is not particularly limited, as long as it is a method in which the organic solvent can be substituted with water (pure water). Examples of this method include a heating substitution method, a decompression substitution method, and a film substitution method. Among these, a heating substitution method is preferable, because it can be consecutively followed by the aging process. In this method, for example, the organic solvent is substituted with water by heating the dispersion liquid to evaporate the organic solvent while adding water to maintain the liquid amount constant. This method is preferably performed at normal pressure in terms of operation. It is noted that the organic solvent can be substituted with water without maintaining the liquid amount constant while concentrating the dispersion liquid, so that the present process also serves as the concentration process.

When the dispersion liquid is heated at normal pressure, water substitution may also be completed when the liquid temperature has substantially reached the boiling point (100° C.) of water. For suppressing the generation of microgels or the like, the liquid temperature is preferably controlled such as not to reach 100° C. (not to come to the boil). In this method, for example, water substitution is completed when the dispersion liquid is heated for a prescribed time in a state in which the liquid temperature is maintained at about 90 to 96° C.

Also, when a film substitution method with an ultrafiltration film or the like is used, an unreacted product can be removed while further suppressing the remainder of particles.

[Aging Process]

In the aging process, the silica particle dispersion liquid is heated at pH 7 or more. When heating is performed at a higher pH and a higher temperature for a longer time, the particle can become denser. Various conditions such as a pH can be appropriately adjusted depending on its intended use. For example, the pH is preferably 7.5 or more, and more preferably 8 or more. Although the upper limit of the pH is not particularly limited, it is, for example, about 10. It is noted that the pH is a value converted at 25° C., unless otherwise stated.

For achieving a prescribed pH, alkali may be added before or during heating. However, when a prescribed pH has been already achieved, alkali may not be added. As alkali, the catalyst used in the above-described silica particle preparation process can be used. The alkali species is preferably ammonia. This is because the use of ammonia facilitates the adjustment of pH, and ammonia does not contain an organic group and a metal element. There is a risk that an organic group may modify the silica particle to reduce the polishing performance and the stability of the dispersion liquid. Also, there is a risk that a metal element may have an influence on the insulation properties of a circuit of a polished substrate.

The heating in the present process is preferably performed under normal pressure at a temperature lower than the boiling point of the dispersion medium such that the silica particle dispersion liquid does not come to the boil. This is because the generation of microgels, and furthermore, the enhancement of filtration properties and the suppression of the generation of defects on the polished substrate can be achieved by heating under the condition that the silica particle dispersion liquid does not come to the boil. For example, the silica particle dispersion liquid can be heated under normal pressure or under pressurization at a temperature lower than the boiling point of the dispersion medium. Specifically, heating at lower than 100° C. under normal pressure is preferable, and heating at 90 to 96° C. under normal pressure is more preferable.

Also, the present process may be performed either in a closed or open system. When the present process is performed in a closed system, discharge of alkali outside the system can be suppressed. Therefore, the particle can be aged while maintaining the pH in the system. On the other hand, when the present process is performed in an open system, alkali is discharged outside the system as the solvent evaporates by heating, if ammonia, amine, or the like is used as alkali.

[Concentration Process]

In the concentration process, the dispersion liquid obtained in the aging process is concentrated at less than pH 7. The lower limit of the pH is about 6.0. In the present process, the dispersion liquid is concentrated in such a manner as not to change the properties of the particle obtained in the aging process. The present concentration process is performed after the aging process. A preliminary concentration process may be performed at an appropriate stage (for example, before the water substitution process) before the aging process. The pH may be adjusted by ion exchange, ultrafiltration, or the like, or a combination thereof, other than the distillation of alkali by heating. The pH is preferably 6.9 or less, and more preferably 6.7 or less.

The concentration method is not particularly limited, as long as it is a method that can increase the silica concentration of the dispersion liquid. Examples of the concentration method include a heating concentration method, a decompression concentration method, and a film concentration method. Among these, a heating concentration method is preferable, because it can consecutively follow the previous process. In this method, for example, the dispersion liquid is concentrated by heating the dispersion liquid while adding the silica particle dispersion liquid as necessary so that the organic solvent and water evaporate.

The heating of the heating concentration method is preferably performed under the condition that the dispersion medium of the dispersion liquid does not come to the boil. The suppression of the generation of microgels, and furthermore, the enhancement of filtration properties and the suppression of the occurrence of defects on the polished substrate can be achieved by heating the dispersion liquid under the condition that it does not come to the boil. That is, the dispersion liquid is preferably heated under normal pressure at a temperature lower than the boiling point of the dispersion medium. Specifically, when the dispersion medium is water, the dispersion liquid is preferably heated at lower than 100° C. under normal pressure, and more preferably heated at 90 to 96° C. under normal pressure.

[Silica Particle Dispersion Liquid]

The silica particle dispersion liquid according to the present embodiment is a dispersion liquid that contains 50% or more of a linked silica particle constituted by linked two or more primary particles having an average particle diameter of 10 to 300 nm. The dispersion liquid contains 40% or more of a linked silica particle constituted by linked two to three primary particles and 5% or more of a linked silica particle constituted by linked four or more primary particles. The silica particle dispersion liquid according to the present embodiment can be produced by the production method of a silica particle dispersion liquid according to the present embodiment.

Here, when the average particle diameter of the primary particle of silica is less than 10 nm, stability of the dispersion liquid is insufficient. Also, since the primary particle diameter is excessively small in this case, the polishing rate of the silica particle as a polishing composition is also insufficient. Conversely, when the average particle diameter exceeds 300 nm, scratches occur on a polished substrate. Accordingly, a desired smoothness may not be obtained. The average particle diameter is preferably 10 to 200 nm, more preferably 12 to 150 nm, further preferably 15 to 100 nm, and particularly preferably 20 to 80 nm.

In the silica particle dispersion liquid according to the present embodiment, the ratio of the linked silica particle constituted by linked two or more primary particles is 50% or more. When the linked ratio is high in this manner, the polishing rate can be improved. Furthermore, since the ratio of a single particle, which is likely to remain on a substrate after polishing, is low, the remainder of particles on a substrate after polishing can be suppressed.

The linked silica particle constituted by linked two to three primary particles is contained at a ratio of 40% or more as described above. The linked silica particle constituted by linked two to three primary particles, in which the number of linked primary particles is small, has a small influence on the surface of a polished substrate, and thus the polishing rate can be expected to improve. When the aggregate breaks during polishing, such a linked particle constituted by linked two to three primary particles is likely to turn sideways in such a manner as to contact with a polished substrate. Therefore, defects are unlikely to occur on the polished substrate, and the contact surface area with the polished substrate increases. This improves the polishing rate. This linked silica particle constituted by linked two to three primary particles is contained at a ratio of preferably 50% or more, and more preferably 60° % or more.

Also, the linked silica particle constituted by linked four or more primary particles is contained at a ratio of 5% or more as described above. This improves the polishing rate. This linked silica particle constituted by linked four or more primary particles is contained at a ratio of preferably 10% or more, more preferably 15% or more, and further preferably 25% or more.

The amount of a "silicon-containing compound" (unreacted product) other than the silica particle present in the dispersion liquid is preferably 200 ppm or less. The smaller the amount of the "silicon-containing compound", the smaller the amount of a product adhering to the substrate. Also, when the amount of the "silicon-containing compound" is small, the adsorption of various chemical agents added to a polishing material and the reaction with various chemical agents are suppressed. Therefore, the effects of various chemical agents can be exerted.

This "silicon-containing compound" encompasses a compound of which reaction has not proceeded to an intended silica particle. Examples thereof include unreacted raw alkoxysilanes and low-molecular hydrolysates (oligomers and microgels) thereof.

In the silica particle, it is preferable that the content of each of alkali metal, alkali earth metal, Fe, Ti, Zn, Pd, Ag, Mn, Co, Mo, Sn, Al, and Zr is less than 0.1 ppm, the content of each of Cu, Ni, and Cr is less than 1 ppb, and the content of each of U and Th is less than 0.3 ppb. These metal elements are an impure content and preferably also not contained in the dispersion liquid. With a polishing material including a dispersion liquid containing these elements in an amount larger than the above-described amounts, the elements remain on the substrate in some cases. In such a case, there may be an increase in impedance of a metal wiring, a delay in response speed, an increase in power consumption, and the like. Also, since these element ions move (disperse), the above-described failures may be caused when the use condition is harsh or when the use extends for a long period. Especially, when U and Th, which generate radiation, remains even in trace amounts, malfunction of a semiconductor may be caused. It is noted that alkali metal includes Li, Na, K, Rb, Cs, and Fr. Alkali earth metal includes Be, Mg, Ca, Sr, Ba, and Ra.

The silica particle concentration in the dispersion liquid is, for example, 12% by mass or more, preferably 15% by mass or more, and more preferably 20% by mass or more. Although the upper limit of the silica particle concentration is not particularly limited, it is, for example, 40% by mass.

[Polishing Composition (Polishing Material)]

The silica particle dispersion liquid according to the present embodiment can be used as a polishing composition by adding another component such as a water-soluble polymer or appropriately using the silica particle in the dispersion liquid for preparation. The polishing composition may contain, other than the silica particle and the water-soluble polymer, additives such as a basic compound, a pH adjuster, a surfactant, and a chelator.

Although the optimum range of the formulation amount of the water-soluble polymer varies depending on the type of the water-soluble polymer compound, it is preferably 0.001 to 10% by mass relative to the total amount of the polishing composition. Also, this range is preferably 0.01 to 80% by mass relative to the silica particle. When the formation amount of the water-soluble polymer is within this range, exchange of the polishing composition in a polishing pad is smoothly performed. Therefore, a high polishing rate and the formation of a good polished surface are easily achieved. The formulation amount of this water-soluble polymer is more preferably 0.001 to 3% by mass relative to the total amount of the polishing composition, and more preferably 0.1 to 20% by mass relative to the silica particle.

Examples of the water-soluble polymer include water-soluble cellulose, water-soluble vinyl polymers, and polyhydric alcohol polymers. Specific examples of the water-soluble cellulose include hydroxymethyl cellulose, hydroxyethyl cellulose, hydroxypropyl cellulose, carboxymethyl cellulose, hydroxyethyl methyl cellulose, hydroxypropyl methyl cellulose, methyl cellulose, ethyl cellulose, ethyl hydroxyethyl cellulose, and carboxymethyl ethyl cellulose. Examples of the water-soluble vinyl polymers include polyvinyl alcohol, polyvinyl pyrrolidone, and carboxyvinyl polymers. Among these, hydroxyethyl cellulose and polyvinyl pyrrolidone are preferable. Examples of the polyhydric alcohol polymers include polyvinyl alcohol, poly(2-propenol), poly(ethylene-1,2-diol), poly(propylene-1,2-diol), poly(propylene-1,3-diol), poly(butadiene-1,4-diol), poly(butadiene-1,3-diol), and poly(butadiene-2,3-diol). These may be used independently or in appropriate combinations.

The concentration of the silica particle in the polishing composition is preferably 0.1 to 50% by mass. When the concentration of the silica particle is less than 0.1% by mass, the polishing rate sometimes decreases depending on the types of the substrate and the insulating film. Conversely, when the concentration of the silica particle exceeds 50% by mass, the stability of the polishing composition is insufficient. This inhibits further improvement of the polishing rate and the polishing efficiency. Also, in this case, a dried product sometimes occurs and adheres in a process of supplying the polishing composition for a polishing treatment. The adhering dried product sometimes causes scratches to occur. The silica particle concentration is more preferably 0.2 to 30% by mass.

EXAMPLES

Hereinafter, examples of the present embodiment will be specifically described.

Example 1

<Silica Particle Preparation Process>

A mixed solvent including a mixture of 202.7 g of pure water, 1651.1 g of methanol, and 65.4 g of ammonia water was maintained at 30° C. To this mixed solvent, 1473.1 g of a methanol solvent (liquid A) of tetramethoxysilane (methyl orthosilicate manufactured by Tama Chemicals Co., Ltd.) was added over 3 hours. At each of 30 minutes (initial alkali catalyst adding process) and 60 minutes (additional alkali catalyst adding process) after the initiation of the addition of the liquid A, 170.1 g of an ammonia water (liquid B) having a concentration of 13.5% by mass was added.

In the initial alkali catalyst adding process, the molar ratio of an alkali catalyst to silica in the liquid in the container increased from 0.30 to 0.72 (increase proportion of a molar ratio: 0.42). Also, in the additional alkali catalyst adding process, the molar ratio of an alkali catalyst to silica in the liquid in the container increased from 0.36 to 0.57 (increase proportion of a molar ratio: 0.21).

<Water Substitution Process>

The silica particle dispersion liquid (silica concentration: 14.6% by mass) obtained in the silica particle dispersion liquid preparation process was substituted with water while adding pure water under normal pressure by a heating substitution method. The water substitution process was terminated when the liquid temperature reached 100° C.

<Aging Process>

After the water substitution process was terminated, a heating treatment was performed under normal pressure while maintaining the liquid temperature at 100° C. In this process, heating was also continued while adding water in the same amount as the distilled liquid amount to maintain the silica concentration in the system constant.

<Concentration Process>

It was confirmed that the pH was lower than 7, and the addition of water was terminated. Thereafter, the dispersion liquid was concentrated at 100° C. under normal pressure until the silica particle concentration reached 20% by mass. In this manner, a silica particle dispersion liquid (A) was prepared.

Table 1 illustrates the average diameter of a silica primary particle and the silica concentration when an alkali catalyst was initially added in the silica particle preparation process and the average particle diameter of the silica particle in the dispersion liquid, the ratio of the linked particle constituted by two to three primary particles, the ratio of the linked particle constituted by four or more primary particles, and the amount of an unreacted product when the concentration process was terminated (the same applies to the following Examples and Comparative Examples). Various parameters were measured in the following methods.

<<Silica Particle Concentration of Dispersion Liquid>>

Five grams of a sample was dried at 150° C. for 1 hour. From the mass of the dried sample, the solid content concentration was calculated. A silica particle concentration was calculated from a value obtained by subtracting, from this solid content concentration, the later described value obtained by converting the metal element content of the silica particle in terms of oxides and the amount of an unreacted product.

<<Average Particle Diameter of Silica Particle>>

An electron micrograph of silica particles was taken. Furthermore, the longest primary particle diameter for each of optional 100 particles was measured as exemplified in FIG. 1. The average value of the measured results was defined as the average particle diameter of the silica particles.

<<Ratio of Linked Particles>>

An electron micrograph of silica particles was taken. Optional 100 particles were checked on the existence or absence of linkage, and grouped into an unlinked particle, a linked particle constituted by linked two primary particles, a linked particle constituted by linked three primary particles, and a linked particle constituted by linked four or more primary particles. For each group, the number of particles was counted, and the ratio of the counted number to the total number of particles was calculated.

<<Amount of Unreacted Product in Dispersion Liquid>>

Using a micro ultracentrifuge (CS150GXL manufactured by Hitachi Koki Co., Ltd.), the dispersion liquid was centrifuged at a set temperature of 10° C. and 137,000 rpm (1,000,000 G) for 30 minutes. A "silicon-containing compound" (unreacted product) other than silica particles present in the supernatant of this treated liquid was measured as Si by an ICP emission analyzer (ICPS-8100 manufactured by Shimadzu Corporation). This measured value was converted into the $SiO_2$ concentration in the dispersion liquid to obtain the amount of an unreacted product.

<<Metal Element Content of Silica Particle>>

The contents of alkali metal, alkali earth metal, Fe, Ti, Zn, Pd, Ag, Mn, Co, Mo, Sn, Al, and Zr, the contents of Cu, Ni, and Cr, and the contents of U and Th in the silica particle were measured in the following manner. First, the silica particle was dissolved with hydrofluoric acid and heated to remove the hydrofluoric acid. Thereafter, pure water was added to the dissolved silica particle as necessary to obtain a solution. The above-described contents were obtained by measuring this solution using an ICP-MS inductively coupled plasma mass analyzer (7900s manufactured by Agilent Technologies, Inc.).

<Production of Polishing Material (A)>

A polishing agent (A) was prepared. This polishing agent contains 3.0% by mass of the linked silica particle dispersion liquid (A), 175 ppm of hydroxyethyl cellulose (HEC), and 225 ppm of ammonia.

<<Polishing Test>>

A substrate to be polished (single crystal silicon wafer having the crystal structure of 1.0.0) was set in a polishing device (NF300 manufactured by Nano Factor Inc.). The substrate to be polished was polished for 10 minutes using a Politex P103 polishing pad driven at a polishing load of 0.05 MPa, a table rotation speed of 50 rpm, and a spindle speed of 50 rpm with the above-described polishing material (A) supplied at a rate of 150 ml/min. Thereafter, the substrate was washed with pure water and air-dried.

Thereafter, the mass decrease of the substrate to be polished was measured to calculate the polishing rate, and evaluation was performed according to the following criteria. Table 1 illustrates the evaluation results.

Polishing rate >25 nm/min: Excellent
Polishing rate 22 to 25 nm/min: Good
Polishing rate 18 to 21 nm/min: Fair
Polishing rate less than 18 nm/min: Poor The polished surface of the obtained substrate was observed through a laser microscope (VK-X250 manufactured by Keyence Corporation). The remainder of particles on the polished substrate was evaluated according to the following evaluation criteria. Table 1 illustrates the evaluation results.

0 particle in remainder: Excellent
1 to 5 particles in remainder: Good
6 to 19 particles in remainder: Fair
20 particles in remainder: Poor Example 2

A silica particle dispersion liquid (B) was prepared in the same method as in Example 1, except that 113.4 g of the liquid B was added at each of 30 minutes (initial alkali catalyst adding process), 60 minutes (first additional alkali catalyst adding process), and 90 minutes (second additional alkali catalyst adding process) after the initiation of the addition of the liquid A.

In the initial alkali catalyst adding process, the molar ratio of an alkali catalyst to silica in the liquid in the container increased from 0.30 to 0.58 (increase proportion of a molar ratio: 0.28). Also, in the first additional alkali catalyst adding process, the molar ratio of an alkali catalyst to silica in the liquid in the container increased from 0.29 to 0.43 (increase proportion of a molar ratio: 0.14). In the second additional alkali catalyst adding process, the molar ratio of an alkali catalyst to silica in the liquid in the container increased from 0.29 to 0.38 (increase proportion of a molar ratio: 0.09).

A polishing material (B) was produced in the same method as in Example 1, except that the silica particle dispersion liquid (B) was used in place of the silica particle dispersion liquid (A). Furthermore, a polishing test was performed in the same method as in Example 1.

Example 3

<Silica Particle Preparation Process>

The liquid A in an amount of 409.2 g was added over 50 minutes. At each of 20 minutes (initial alkali catalyst adding process) and 40 minutes (additional alkali catalyst adding process) after the initiation of the addition of the liquid A, 170.1 g of the liquid B was added. In this manner, a silica particle was prepared.

In the initial alkali catalyst adding process, the molar ratio of an alkali catalyst to silica in the liquid in the container increased from 0.45 to 1.07 (increase proportion of a molar ratio: 0.62). Also, in the first additional alkali catalyst adding process, the molar ratio of an alkali catalyst to silica in the liquid in the container increased from 0.54 to 0.85 (increase proportion of a molar ratio: 0.31).

<Preliminary Concentration Process>

A preliminary concentration was performed by heating the silica particle dispersion liquid (silica concentration: 5.7% by mass) obtained in the silica particle preparation process at normal pressure while adding the liquid. When the silica concentration reached 14.6% by mass, the preliminary concentration process was terminated. Thereafter, the water substitution process and subsequent processes were performed in the same method as in Example 1. In this manner, a silica particle dispersion liquid (C) was prepared.

A polishing material (C) was produced in the same method as in Example 1, except that the silica particle dispersion liquid (C) was used in place of the silica particle dispersion liquid (A). Furthermore, a polishing test was performed in the same method as in Example 1.

Example 4

The liquid A was added over 2 hours. A silica particle dispersion liquid (D) was prepared in the same method as in Example 1, except that 113.4 g of the liquid B was added at each of 20 minutes (initial alkali catalyst adding process), 40 minutes (first additional alkali catalyst adding process), and 60 minutes (second additional alkali catalyst adding process) after the initiation of the addition of the liquid A.

In the initial alkali catalyst adding process, the molar ratio of an alkali catalyst to silica in the liquid in the container increased from 0.30 to 0.58 (increase proportion of a molar ratio: 0.28). Also, in the first additional alkali catalyst adding process, the molar ratio of an alkali catalyst to silica in the liquid in the container increased from 0.29 to 0.43 (increase proportion of a molar ratio: 0.14). In the second additional alkali catalyst adding process, the molar ratio of an alkali catalyst to silica in the liquid in the container increased from 0.29 to 0.38 (increase proportion of a molar ratio: 0.09).

A polishing material (D) was produced in the same method as in Example 1, except that the silica particle dispersion liquid (D) was used in place of the silica particle dispersion liquid (A). Furthermore, a polishing test was performed in the same method as in Example 1.

Example 5

The liquid A was added over 2 hours. A silica particle dispersion liquid (E) was prepared in the same method as in Example 1, except that 68.0 g of the liquid B was added at each of 10 minutes (initial alkali catalyst adding process), 30 minutes (first additional alkali catalyst adding process), 50 minutes (second additional alkali catalyst adding process), 70 minutes (third additional alkali catalyst adding process), and 90 minutes (fourth additional alkali catalyst adding process) after the initiation of the addition of the liquid A.

In the initial alkali catalyst adding process, the molar ratio of an alkali catalyst to silica in the liquid in the container increased from 0.60 to 0.93 (increase proportion of a molar ratio: 0.33). Also, in the first additional alkali catalyst adding process, the molar ratio of an alkali catalyst to silica in the liquid in the container increased from 0.31 to 0.42 (increase proportion of a molar ratio: 0.11). In the second additional alkali catalyst adding process, the molar ratio of an alkali catalyst to silica in the liquid in the container increased from 0.25 to 0.32 (increase proportion of a molar ratio: 0.07). In the third additional alkali catalyst adding process, the molar ratio of an alkali catalyst to silica in the liquid in the container increased from 0.23 to 0.28 (increase proportion of a molar ratio: 0.05). In the fourth additional alkali catalyst adding process, the molar ratio of an alkali catalyst to silica in the liquid in the container increased from 0.14 to 0.25 (increase proportion of a molar ratio: 0.11).

A polishing material (E) was produced in the same method as in Example 1, except that the silica particle dispersion liquid (E) was used in place of the silica particle dispersion liquid (A). Furthermore, a polishing test was performed in the same method as in Example 1.

Example 6

A silica particle dispersion liquid (F) was prepared in the same method as in Example 1, except that 170.1 g of the liquid B was added at each of 55 minutes (initial alkali catalyst adding process) and 110 minutes (first additional alkali catalyst adding process) after the initiation of the addition of the liquid A.

In the initial alkali catalyst adding process, the molar ratio of an alkali catalyst to silica in the liquid in the container increased from 0.16 to 0.39 (increase proportion of a molar ratio: 0.23). Also, in the additional alkali catalyst adding process, the molar ratio of an alkali catalyst to silica in the liquid in the container increased from 0.20 to 0.31 (increase proportion of a molar ratio: 0.11).

A polishing material (F) was produced in the same method as in Example 1, except that the silica particle dispersion liquid (F) was used in place of the silica particle dispersion liquid (A). Furthermore, a polishing test was performed in the same method as in Example 1.

Example 7

The liquid A in an amount of 491.0 g was added over 40 minutes. At each of 20 minutes (initial alkali catalyst adding process) and 40 minutes (first additional alkali catalyst adding process) after the initiation of the addition of the liquid A, 113.4 g of the liquid (B) was added. After the termination of the addition, preliminary aging was performed at 50° C. under normal pressure for 1 hour. Thereafter, 982.1 g of the liquid A was re-added over 80 minutes. A silica particle dispersion liquid (G) was prepared in the same method as in Example 1, except that 113.4 g of the liquid B was added at 20 minutes (second additional alkali catalyst adding process) after the initiation of the re-addition of the liquid A.

In the initial alkali catalyst adding process, the molar ratio of an alkali catalyst to silica in the liquid in the container increased from 0.30 to 0.58 (increase proportion of a molar ratio: 0.28). Also, in the first additional alkali catalyst adding process, the molar ratio of an alkali catalyst to silica in the liquid in the container increased from 0.29 to 0.43 (increase proportion of a molar ratio: 0.14). In the second additional alkali catalyst adding process, the molar ratio of an alkali catalyst to silica in the liquid in the container increased from 0.29 to 0.38 (increase proportion of a molar ratio: 0.09).

A polishing material (G) was produced in the same method as in Example 1, except that the silica particle dispersion liquid (G) was used in place of the silica particle dispersion liquid (A). Furthermore, a polishing test was performed in the same method as in Example 1.

Example 8

A silica particle dispersion liquid (H) was prepared in the same method as in Example 1, except that the water substitution process included removing an unreacted product through an ultrafiltration film with pure water and adjusting the pH to 8.4 with ammonia water.

In the initial alkali catalyst adding process, the molar ratio of an alkali catalyst to silica in the liquid in the container increased from 0.30 to 0.58 (increase proportion of a molar ratio: 0.28). Also, in the first additional alkali catalyst adding process, the molar ratio of an alkali catalyst to silica in the liquid in the container increased from 0.29 to 0.43 (increase proportion of a molar ratio: 0.14). In the second additional alkali catalyst adding process, the molar ratio of an alkali catalyst to silica in the liquid in the container increased from 0.29 to 0.38 (increase proportion of a molar ratio: 0.09).

A polishing material (H) was produced in the same method as in Example 1, except that the silica particle dispersion liquid (H) was used in place of the silica particle dispersion liquid (A). Furthermore, a polishing test was performed in the same method as in Example 1.

In the silica particle according to any of Examples, the content of each of alkali metal, alkali earth metal, Fe, Ti, Zn, Pd, Ag, Mn, Co, Mo, Sn, Al, and Zr was less than 0.1 ppm, the content of each of Cu, Ni, and Cr was less than 1 ppb, and the content of each of U and Th was less than 0.3 ppb.

Comparative Example 1

<Silica Particle Preparation Process>

A mixed solvent including a mixture of 202.7 g of pure water, 1651.1 g of methanol, and 65.4 g of ammonia water was maintained at 30° C. To this solvent, 1473.1 g of a methanol solvent (liquid A) of tetramethoxysilane (methyl orthosilicate manufactured by Tama Chemicals Co., Ltd.) and 340.2 g of an ammonia water (liquid B) having a concentration of 13.5% by mass were concurrently added over 3 hours. Otherwise, a silica particle dispersion liquid (RF-A) was prepared in the same method as in Example 1.

A polishing material (RF-A) was produced in the same method as in Example 1, except that the silica particle dispersion liquid (RF-A) was used in place of the silica particle dispersion liquid (A). Furthermore, a polishing test was performed in the same method as in Example 1.

Comparative Example 2

A silica particle dispersion liquid (RF-B) was prepared in the same method as in Example 1, except that 68.0 g of the liquid B was added at each of 10 minutes (initial alkali catalyst adding process), 30 minutes (first additional alkali catalyst adding process), 50 minutes (second additional alkali catalyst adding process), 70 minutes (third additional alkali catalyst adding process), and 90 minutes (fourth additional alkali catalyst adding process) after the initiation of the addition of the liquid A.

In the initial alkali catalyst adding process, the molar ratio of an alkali catalyst to silica in the liquid in the container increased from 0.89 to 1.40 (increase proportion of a molar ratio: 0.51). Also, in the first additional alkali catalyst adding process, the molar ratio of an alkali catalyst to silica in the liquid in the container increased from 0.47 to 0.63 (increase proportion of a molar ratio: 0.16). In the second additional alkali catalyst adding process, the molar ratio of an alkali catalyst to silica in the liquid in the container increased from 0.38 to 0.48 (increase proportion of a molar ratio: 0.10). In the third additional alkali catalyst adding process, the molar ratio of an alkali catalyst to silica in the liquid in the container increased from 0.34 to 0.41 (increase proportion of a molar ratio: 0.07). In the fourth additional alkali catalyst adding process, the molar ratio of an alkali catalyst to silica in the liquid in the container increased from 0.32 to 0.38 (increase proportion of a molar ratio: 0.06).

A polishing material (RF-B) was produced in the same method as in Example 1, except that the silica particle dispersion liquid (RF-B) was used in place of the silica particle dispersion liquid (A). Furthermore, a polishing test was performed in the same method as in Example 1.

Comparative Example 3

A silica particle dispersion liquid (RF-C) was prepared in the same method as in Example 1, except that 34.0 g of the liquid B was added at each of 30 minutes (initial alkali catalyst adding process), 40 minutes (first additional alkali catalyst adding process), 50 minutes (second additional alkali catalyst adding process), 60 minutes (third additional alkali catalyst adding process), 70 minutes (fourth additional alkali catalyst adding process), 80 minutes (fifth additional alkali catalyst adding process), 90 minutes (sixth additional alkali catalyst adding process), 100 minutes (seventh additional alkali catalyst adding process), 110 minutes (eighth additional alkali catalyst adding process), and 120 minutes (ninth additional alkali catalyst adding process) after the initiation of the addition of the liquid A.

In the initial alkali catalyst adding process, the molar ratio of an alkali catalyst to silica in the liquid in the container increased from 0.30 to 0.38 (increase proportion of a molar ratio: 0.08). Also, in the first additional alkali catalyst adding process, the molar ratio of an alkali catalyst to silica in the liquid in the container increased from 0.29 to 0.35 (increase proportion of a molar ratio: 0.06). In the second additional alkali catalyst adding process, the molar ratio of an alkali catalyst to silica in the liquid in the container increased from 0.28 to 0.33 (increase proportion of a molar ratio: 0.05). In the third additional alkali catalyst adding process, the molar ratio of an alkali catalyst to silica in the liquid in the container increased from 0.27 to 0.32 (increase proportion of a molar ratio: 0.05). In the fourth additional alkali catalyst adding process, the molar ratio of an alkali catalyst to silica in the liquid in the container increased from 0.27 to 0.31 (increase proportion of a molar ratio: 0.04). In the fifth additional alkali catalyst adding process, the molar ratio of an alkali catalyst to silica in the liquid in the container increased from 0.27 to 0.30 (increase proportion of a molar ratio: 0.03). In the sixth additional alkali catalyst adding process, the molar ratio of an alkali catalyst to silica in the liquid in the container increased from 0.27 to 0.29 (increase proportion of a molar ratio: 0.02). In the seventh additional alkali catalyst adding process, the molar ratio of an alkali catalyst to silica in the liquid in the container increased from 0.27 to 0.29 (increase proportion of a molar ratio: 0.02). In the eighth additional alkali catalyst adding process, the molar ratio of an alkali catalyst to silica in the liquid in the container increased from 0.26 to 0.29 (increase proportion of a molar ratio: 0.03). In the ninth additional alkali catalyst adding process, the molar ratio of an alkali catalyst to silica in the liquid in the container increased from 0.26 to 0.28 (increase proportion of a molar ratio: 0.02).

A polishing material (RF-C) was produced in the same method as in Example 1, except that the silica particle dispersion liquid (RF-C) was used in place of the silica particle dispersion liquid (A). Furthermore, a polishing test was performed in the same method as in Example 1.

Comparative Example 4

A silica particle dispersion liquid (RF-D) was prepared in the same method as in Example 1, except that 170.1 g of the liquid B was added at each of 90 minutes (initial alkali catalyst adding process) and 135 minutes (first additional alkali catalyst adding process) after the initiation of the addition of the liquid A.

In the initial alkali catalyst adding process, the molar ratio of an alkali catalyst to silica in the liquid in the container increased from 0.10 to 0.24 (increase proportion of a molar ratio: 0.14). Also, in the first additional alkali catalyst adding process, the molar ratio of an alkali catalyst to silica in the liquid in the container increased from 0.16 to 0.25 (increase proportion of a molar ratio: 0.09).

A polishing material (RF-D) was produced in the same method as in Example 1, except that the silica particle dispersion liquid (RF-D) was used in place of the silica particle dispersion liquid (A). Furthermore, a polishing test was performed in the same method as in Example 1.

Comparative Example 5

A silica particle dispersion liquid (RF-E) was prepared in the same method as in Example 1, except that 170.1 g of the liquid B was added at each of 1 minute (initial alkali catalyst adding process) and 60 minutes (first additional alkali catalyst adding process) after the initiation of the addition of the liquid A.

In the initial alkali catalyst adding process, the molar ratio of an alkali catalyst to silica in the liquid in the container increased from 4.97 to 11.93 (increase proportion of a molar ratio: 6.96). Also, in the first additional alkali catalyst adding process, the molar ratio of an alkali catalyst to silica in the liquid in the container increased from 0.36 to 0.57 (increase proportion of a molar ratio: 0.21).

A polishing material (RF-E) was produced in the same method as in Example 1, except that the silica particle dispersion liquid (RF-E) was used in place of the silica particle dispersion liquid (A). Furthermore, a polishing test was performed in the same method as in Example 1.

Comparative Example 6

A silica particle dispersion liquid (RF-F) was prepared in the same method as in Example 1, except that 28.4 g of the liquid B was added at 10 minutes (initial alkali catalyst adding process) after the initiation of the addition of the liquid A, and 155.9 g of the liquid B was added at each of 120 minutes (first additional alkali catalyst adding process) and 150 minutes (second additional alkali catalyst adding process) after the initiation of the addition of the liquid A.

In the initial alkali catalyst adding process, the molar ratio of an alkali catalyst to silica in the liquid in the container increased from 0.89 to 1.10 (increase proportion of a molar ratio: 0.21). Also, in the first additional alkali catalyst adding process, the molar ratio of an alkali catalyst to silica in the liquid in the container increased from 0.09 to 0.19 (increase proportion of a molar ratio: 0.10). In the second additional alkali catalyst adding process, the molar ratio of an alkali catalyst to silica in the liquid in the container increased from 0.15 to 0.23 (increase proportion of a molar ratio: 0.08).

A polishing material (RF-F) was produced in the same method as in Example 1, except that the silica particle dispersion liquid (RF-F) was used in place of the silica particle dispersion liquid (A). Furthermore, a polishing test was performed in the same method as in Example 1.

Comparative Example 7

A silica particle dispersion liquid (RF-G) was prepared in the same method as in Example 1, except that 68.0 g of the liquid B was added at each of 45 minutes (initial alkali catalyst adding process), 70 minutes (first additional alkali catalyst adding process), 90 minutes (second additional alkali catalyst adding process), 110 minutes (third additional alkali catalyst adding process), and 130 minutes (fourth additional alkali catalyst adding process) after the initiation of the addition of the liquid A.

In the initial alkali catalyst adding process, the molar ratio of an alkali catalyst to silica in the liquid in the container increased from 0.20 to 0.31 (increase proportion of a molar ratio: 0.11). Also, in the first additional alkali catalyst adding process, the molar ratio of an alkali catalyst to silica in the liquid in the container increased from 0.20 to 0.27 (increase proportion of a molar ratio: 0.07). In the second additional alkali catalyst adding process, the molar ratio of an alkali catalyst to silica in the liquid in the container increased from 0.21 to 0.27 (increase proportion of a molar ratio: 0.06). In the third additional alkali catalyst adding process, the molar ratio of an alkali catalyst to silica in the liquid in the container increased from 0.22 to 0.26 (increase proportion of a molar ratio: 0.04). In the fourth additional alkali catalyst adding process, the molar ratio of an alkali catalyst to silica in the liquid in the container increased from 0.22 to 0.26 (increase proportion of a molar ratio: 0.04).

A polishing material (RF-G) was produced in the same method as in Example 1, except that the silica particle dispersion liquid (RF-G) was used in place of the silica particle dispersion liquid (A). Furthermore, a polishing test was performed in the same method as in Example 1.

Comparative Example 8

A mixed solvent including a mixture of 202.7 g of pure water, 1651.1 g of methanol, and 65.4 g of ammonia water was maintained at 10° C. At each of 65 minutes (initial alkali catalyst adding process) and 95 minutes (first additional alkali catalyst adding process) after the initiation of the addition of the liquid A, 170.1 g of the liquid B was added. Otherwise, a silica particle dispersion liquid (RF-H) was prepared in the same method as in Example 1.

In the initial alkali catalyst adding process, the molar ratio of an alkali catalyst to silica in the liquid in the container increased from 0.14 to 0.33 (increase proportion of a molar ratio: 0.19). Also, in the first additional alkali catalyst adding process, the molar ratio of an alkali catalyst to silica in the liquid in the container increased from 0.23 to 0.36 (increase proportion of a molar ratio: 0.13).

A polishing material (RF-H) was produced in the same method as in Example 1, except that the silica particle dispersion liquid (RF-H) was used in place of the silica particle dispersion liquid (A). Furthermore, a polishing test was performed in the same method as in Example 1.

In the silica particles of Comparative Examples, the content of each of alkali metal, alkali earth metal, Fe, Ti, Zn, Pd, Ag, Mn, Co, Mo, Sn, Al, and Zr was less than 0.1 ppm, the content of each of Cu, Ni, and Cr was less than 1 ppb, and the content of each of U and Th was less than 0.3 ppb.

TABLE 1

| | | | | Example 1 | Example 2 | Example 3 | Example 4 | Example 5 | Example 6 | Example 7 | Example 8 |
|---|---|---|---|---|---|---|---|---|---|---|---|
| Silica particle preparation process | Average diameter (nm) of primary particle of silica when initially adding alkali catayst | | | 14 | 14 | 11 | 15 | 12 | 17 | 15 | 15 |
| | Silica particle concentration (%) when initially adding alkali catalyst | | | 4.2 | 4.2 | 2.9 | 4.2 | 2.2 | 7.0 | 4.2 | 4.2 |
| | Molar ratio of alkali catalyst to silica due to addition of alkali catalyst | Initial | Value | 0.30 ↓ 0.72 | 0.30 ↓ 0.58 | 0.45 ↓ 1.07 | 0.30 ↓ 0.58 | 0.60 ↓ 0.93 | 0.16 ↓ 0.39 | 0.30 ↓ 0.58 | 0.30 ↓ 0.58 |
| | | | Increase proportion | 0.42 | 0.28 | 0.62 | 0.28 | 0.33 | 0.23 | 0.28 | 0.28 |
| | | First additional | Value | 0.36 ↓ 0.57 | 0.29 ↓ 0.43 | 0.54 ↓ 0.85 | 0.29 ↓ 0.43 | 0.31 ↓ 0.42 | 0.20 ↓ 0.31 | 0.29 ↓ 0.43 | 0.29 ↓ 0.43 |
| | | | Increase proportion | 0.21 | 0.14 | 0.31 | 0.14 | 0.11 | 0.11 | 0.14 | 0.14 |
| | | Second additional | Value | — | 0.29 ↓ 0.38 | — | 0.29 ↓ 0.38 | 0.25 ↓ 0.32 | — | 0.29 ↓ 0.38 | 0.29 ↓ 0.38 |

TABLE 1-continued

| | | | | | | | | | | |
|---|---|---|---|---|---|---|---|---|---|---|
| | | | Increase proportion | — | 0.09 | — | 0.09 | 0.07 | — | 0.09 | 0.09 |
| | | Third additional | Value | — | — | — | — | 0.23 ↓ 0.28 | — | — | — |
| | | | Increase proportion | — | — | — | — | 0.05 | — | — | — |
| | | Fourth additional | Value | — | — | — | — | 0.14 ↓ 0.25 | — | — | — |
| | | | Increase proportion | — | — | — | — | 0.11 | — | — | — |
| | | Fifth additional | Increase proportion | — | — | — | — | — | — | — | — |
| | | Sixth additional | Increase proportion | — | — | — | — | — | — | — | — |
| | | Seventh additional | Increase proportion | — | — | — | — | — | — | — | — |
| | | Eighth additional | Increase proportion | — | — | — | — | — | — | — | — |
| | | Ninth additional | Increase proportion | — | — | — | — | — | — | — | — |
| After concentration process | Average particle diameter (nm) of silica particle | | | 90 | 40 | 160 | 50 | 80 | 70 | 50 | 50 |
| | Ratio (%) of linked particle | 2 to 3 primary particles | | | | | | | | | |
| | | 4 or more primary particles | | 51 | 43 | 41 | 48 | 41 | 43 | 52 | 48 |
| | | | | 31 | 8 | 55 | 10 | 28 | 10 | 6 | 10 |
| | Unreacted product (ppm) | | | 150 | 140 | 160 | 160 | 160 | 150 | 130 | 110 |
| | Silica particle concentration (%) of dispersion liquid | | | 20 | 20 | 20 | 20 | 20 | 20 | 20 | 20 |
| Polishing material | Polishing properties | Polishing rate | | Excellent | Good | Excellent | Good | Excellent | Good | Excellent | Good |
| | | Remainder of particles | | Excellent | Good | Excellent | Good | Good | Good | Good | Excellent |

| | | | | Comparative Example 1 | Comparative Example 2 | Comparative Example 3 | Comparative Example 4 | Comparative Example 5 | Comparative Example 6 | Comparative Example 7 | Comparative Example 8 |
|---|---|---|---|---|---|---|---|---|---|---|---|
| Silica particle preparation process | Average diameter (nm) of primary particle of silica when initially adding alkali catayst | | | — | 10 | 14 | 20 | <5 | 20 | 16 | 220 |
| | Silica particle concentration (%) when initially adding alkali catalyst | | | — | 1.5 | 4.2 | 10.2 | 0.3 | 1.5 | 6.0 | 8.0 |
| | Molar ratio of alkali catalyst to silica due to addition of alkali catalyst | Initial | Value | — | 0.89 ↓ 1.40 | 0.30 ↓ 0.38 | 0.10 ↓ 0.24 | 4.97 ↓ 11.93 | 0.89 ↓ 1.10 | 0.20 ↓ 0.31 | 0.14 ↓ 0.33 |
| | | | Increase proportion | — | 0.51 | 0.08 | 0.14 | 6.96 | 0.21 | 0.11 | 0.19 |
| | | First additional | Value | — | 0.47 ↓ 0.63 | 0.29 ↓ 0.35 | 1.16 ↓ 0.25 | 0.36 ↓ 0.57 | 0.09 ↓ 0.19 | 0.20 ↓ 0.27 | 0.23 ↓ 0.36 |
| | | | Increase proportion | — | 0.16 | 0.06 | 0.09 | 0.21 | 0.10 | 0.07 | 0.13 |
| | | Second additional | Value | — | 0.38 ↓ 0.48 | 0.28 ↓ 0.33 | — | — | 0.15 ↓ 0.23 | 0.21 ↓ 0.27 | — |
| | | | Increase proportion | — | 0.10 | 0.05 | — | — | 0.08 | 0.06 | — |
| | | Third additional | Value | — | 0.34 ↓ 0.41 | 0.27 ↓ 0.32 | — | — | — | 0.22 ↓ 0.26 | — |
| | | | Increase proportion | — | 0.07 | 0.05 | — | — | — | 0.04 | — |
| | | Fourth additional | Value | — | 0.32 ↓ 0.38 | 0.27 ↓ 0.31 | — | — | — | 0.22 ↓ 0.26 | — |
| | | | Increase proportion | — | 0.06 | 0.04 | — | — | — | 0.04 | — |
| | | Fifth additional | Increase proportion | — | — | 0.03 | — | — | — | — | — |
| | | Sixth additional | Increase proportion | — | — | 0.02 | — | — | — | — | — |
| | | Seventh additional | Increase proportion | — | — | 0.02 | — | — | — | — | — |
| | | Eighth additional | Increase proportion | — | — | 0.03 | — | — | — | — | — |
| | | Ninth additional | Increase proportion | — | — | 0.02 | — | — | — | — | — |

TABLE 1-continued

| | | | | | | | | | | |
|---|---|---|---|---|---|---|---|---|---|---|
| After concentration process | Average particle diameter (nm) of silica particle | | 40 | 50 | 40 | 30 | 80 | 30 | 40 | 120 |
| | Ratio (%) of linked particle | 2 to 3 primary particles | 47 | 27 | 44 | 27 | 17 | 26 | 37 | 15 |
| | | 4 or more primary particles | 1 | 8 | 3 | 7 | 1 | 7 | 6 | 5 |
| | Unreacted product (ppm) | | 150 | 150 | 150 | 210 | 150 | 220 | 160 | 280 |
| | Silica particle concentration (%) of dispersion liquid | | 20 | 20 | 20 | 20 | 20 | 20 | 20 | 20 |
| Polishing material | Polishing properties | Polishing rate | Fair | Fair | Poor | Fair | Fair | Fair | Fair | Excellent |
| | | Remainder of particles | Fair | Fair | Fair | Poor | Poor | Poor | Fair | Poor |

What is claimed is:

1. A production method of a silica particle dispersion liquid, comprising preparing a linked silica particle by adding a liquid A containing alkoxysilane and a liquid B containing an alkali catalyst to a liquid containing water, an organic solvent, and an alkali catalyst in a container, wherein
the preparing a linked silica particle includes initially adding an alkali catalyst,
the initially adding an alkali catalyst includes
decreasing a molar ratio of an alkali catalyst to silica in the liquid in the container to 0.15 to 0.60 by adding the liquid A containing alkoxysilane to the liquid in the container, and
increasing the molar ratio of an alkali catalyst to silica by 0.2 or more by adding the liquid B to the liquid having the decreased molar ratio in the container.

2. The production method of a silica particle dispersion liquid according to claim 1,
wherein an average particle diameter of a primary particle of silica in the container immediately before the addition of the liquid B in the initially adding an alkali catalyst is 5 to 200 nm.

3. The production method of a silica particle dispersion liquid according to claim 1,
wherein a silica concentration of the liquid in the container immediately before the addition of the liquid B in the initially adding an alkali catalyst is 0.5 to 10% by mass.

4. The production method of a silica particle dispersion liquid according to claim 1, wherein
the preparing a linked silica particle further includes additionally adding an alkali catalyst after the initially adding an alkali catalyst, and
the additionally adding an alkali catalyst includes
decreasing a molar ratio of an alkali catalyst to silica in the liquid in the container to 0.10 to 0.55, and
increasing the molar ratio of an alkali catalyst to silica by 0.05 or more by adding the liquid B to the liquid having the decreased molar ratio in the container.

5. The production method of a silica particle dispersion liquid according to claim 4,
wherein the preparing a linked silica particle includes the additionally adding an alkali catalyst which is performed 1 to 4 times.

* * * * *